Inventor
Henry L. Rosenthal

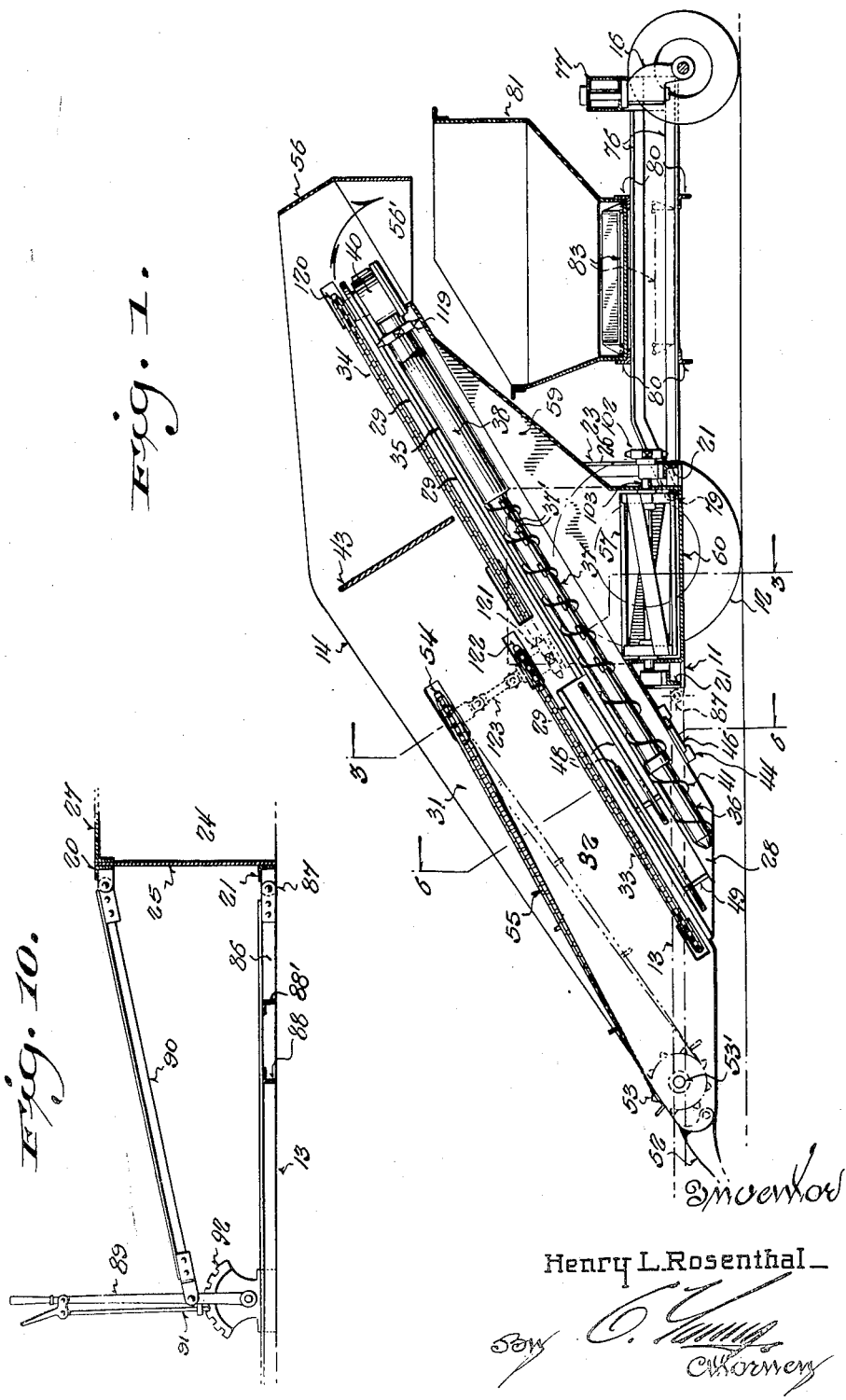

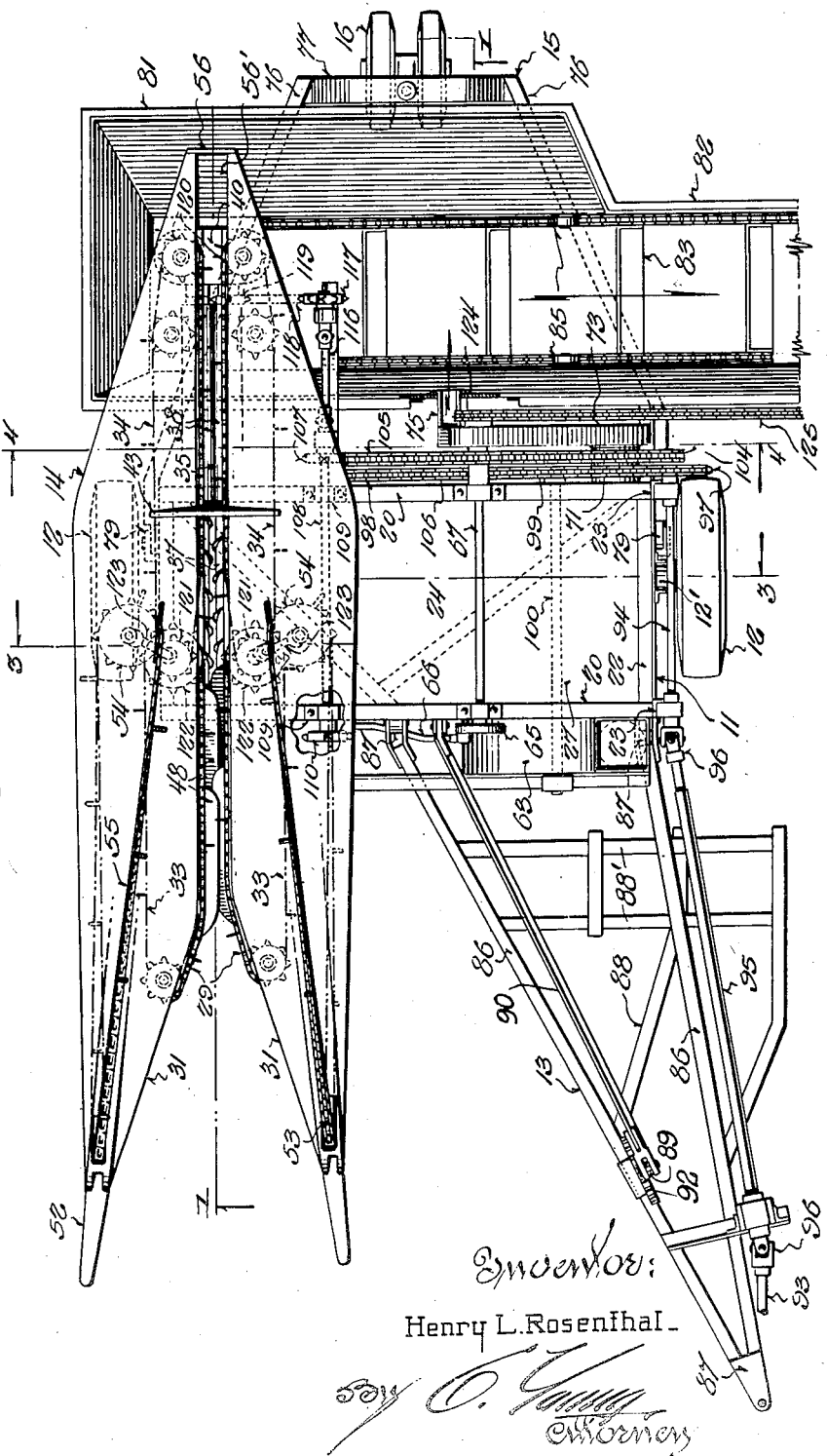

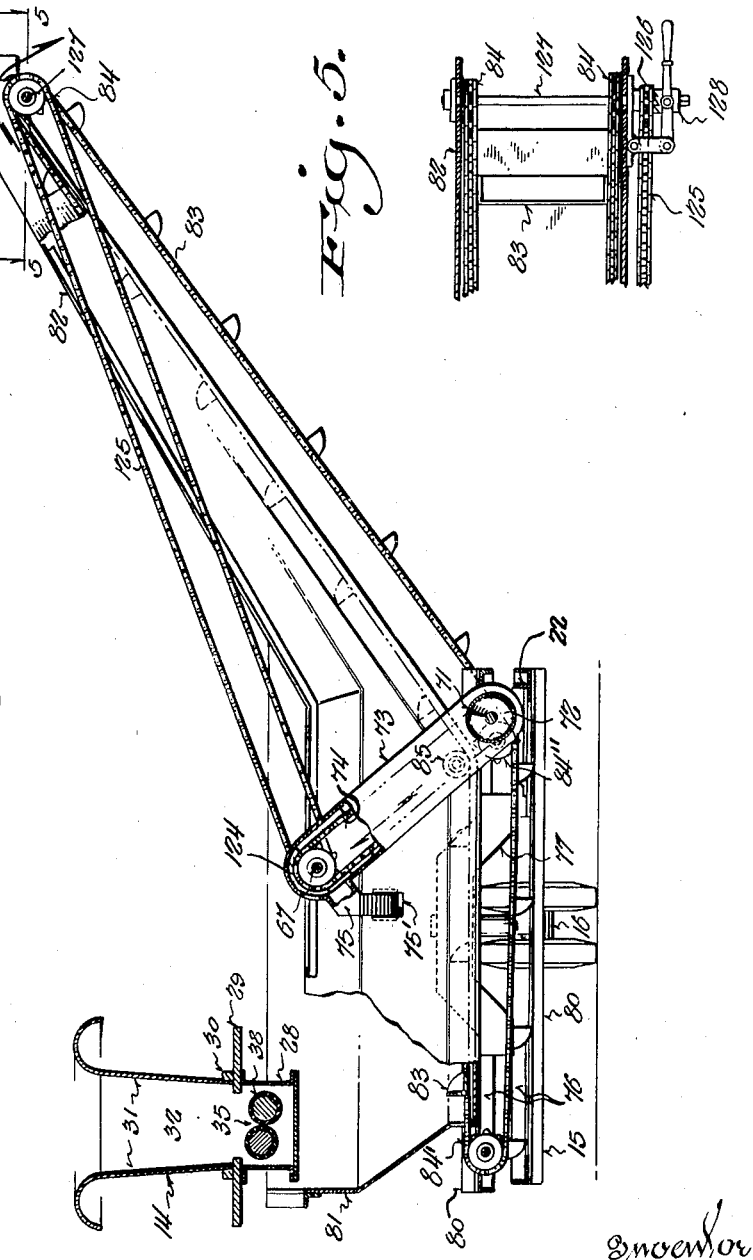

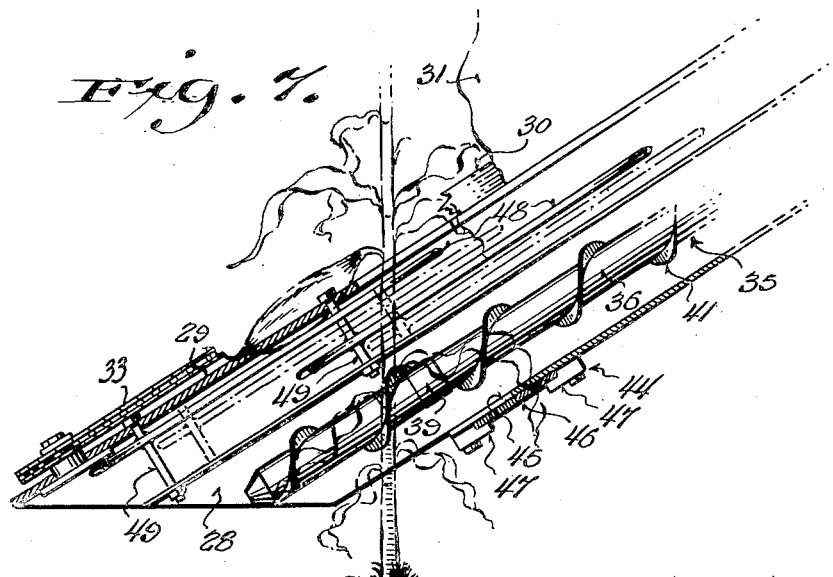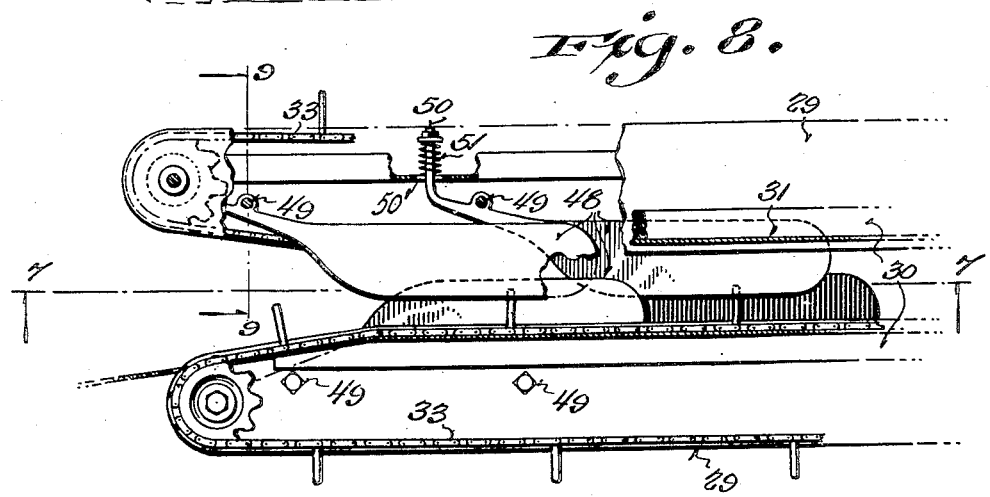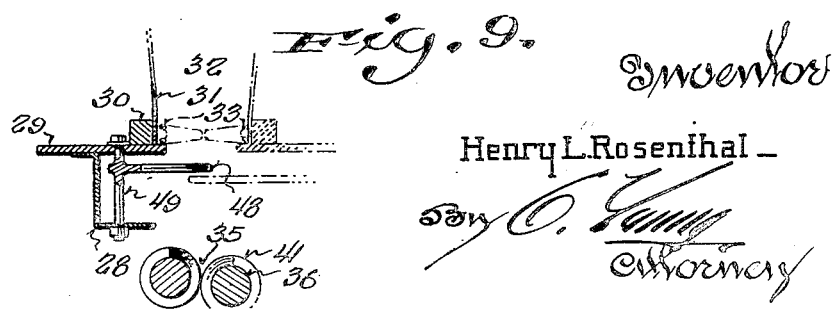

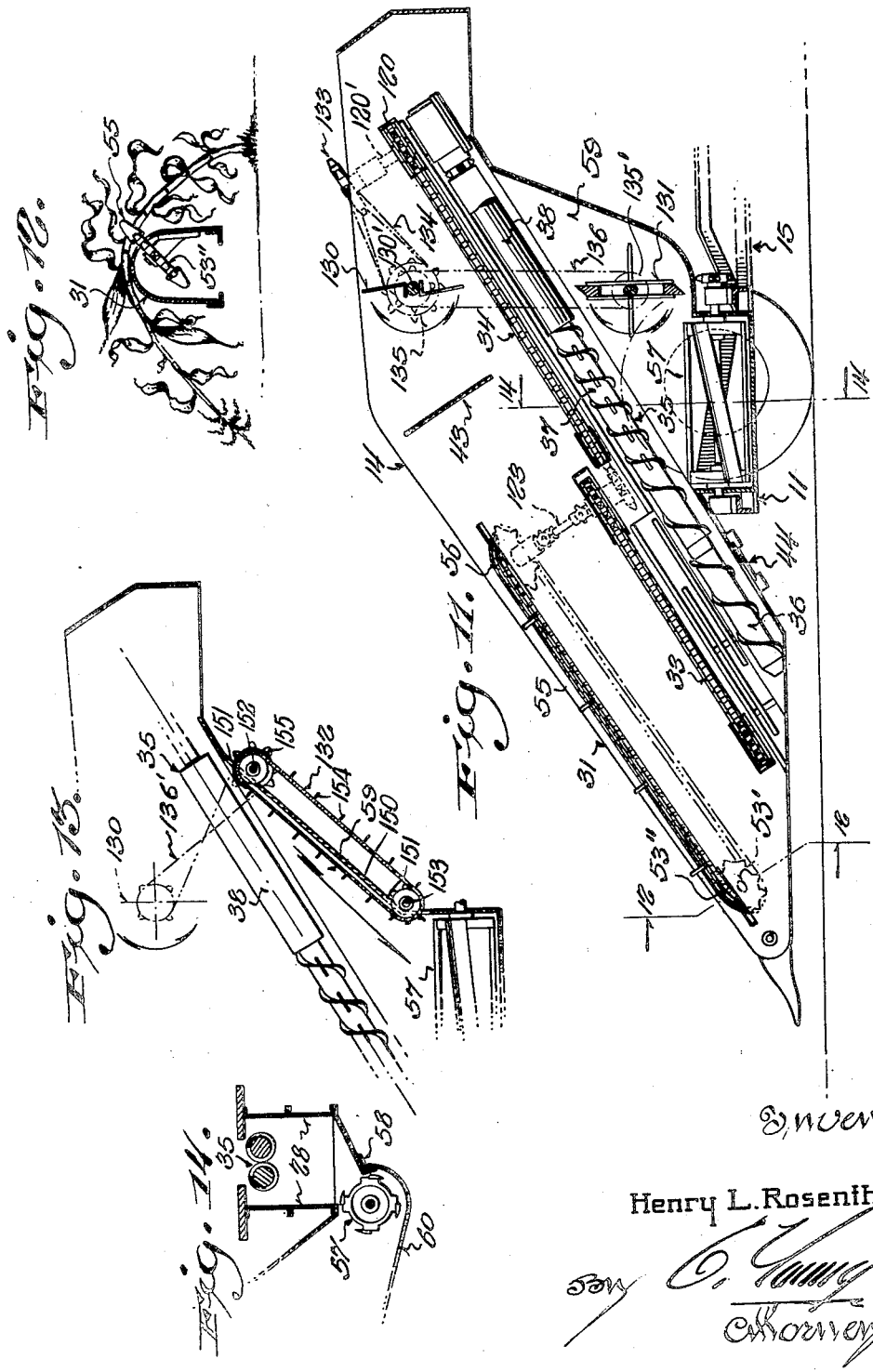

Patented Mar. 21, 1950

2,501,097

UNITED STATES PATENT OFFICE 2,501,097

CORN HARVESTER

Henry L. Rosenthal, West Allis, Wis.

Application April 13, 1944, Serial No. 530,805

7 Claims. (Cl. 56—61)

This invention relates to corn harvesters designed to cut standing stalks in the field, snap and husk the ears, and chop the stalks and husks for fodder.

The difficulties and problems encountered, and which undoubtedly account for the lack of commercial machines today, result largely from the character of the crop which varies considerably not only in size and characteristics, but in the condition of the crop dependent upon the time of harvesting.

Also, due to the bulk of the crop, a problem is presented in economically transporting the husked ears, fodder and shelled corn from the harvester in the field, to distant points of storage.

The usual practice today is to employ one or more trailers hitched to either a harvester or tractor for receiving the separated elements of the crop, and when these are filled they must be transported from the field, frequently a considerable distance. Therefore, to permit continuous economical operation of the harvester, extra trailers and farm hands are required to quickly replace the loaded trailers.

The present invention has primarily for its object the provision of a corn harvester which will most efficiently harvest corn in the field, regardless of variation in size or condition, and which materially facilitates transportation of the husked ears and shelled corn from the field, to allow maximum capacity with a minimum number of farm hands.

Incidental to the foregoing, a more specific object resides in equipping a harvester with a storage bin for receiving the husked ears and shelled corn, and provided with a discharge conveyor that can be selectively operated as the harvester is working over a row to deliver the ears and shelled corn to a truck or conveyance for transportation from the field.

Another object resides in the provision of means for effectively gathering and righting fallen or disalined stalks and guiding the same to the rolls, together with means for positively gripping the stalks during the initial feeding operation prior to cutting, and during the subsequent snapping operation.

A further object is to provide means to allow the passage of stalks through the rolls but prevent engagement and mutilation of the ears by the rolls during the initial feeding operation prior to snapping.

Another object resides in the provision of novel means for collecting and delivering the shelled corn from the separator.

It is also important to provide means, such as a beater or conveyor, positioned below the upper end of the husking rolls to positively deliver husks to the shredder and prevent accumulation and clogging within the delivery chute, which frequently occurs when gravity alone is depended upon.

A further object is to provide delivery means disposed in a substantially straight line between the bottom of the chopper and the fodder discharge to avoid accumulation and choking of the chopped material.

A more detailed object is to mount the storage bin upon a trailer frame connected to the harvester, to relieve excessive weight on the harvester and also permit the use of a standard harvester frame construction which will accommodate ready installation of other types of discharge conveyors in the absence of the present storage bin.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawings:

Fig. 1 is a longitudinal vertical sectional view through a harvester incorporating the present invention, the same being taken on the line 1—1 of Fig. 2;

Fig. 2 is a plan view of the same, parts being broken away;

Figure 5:
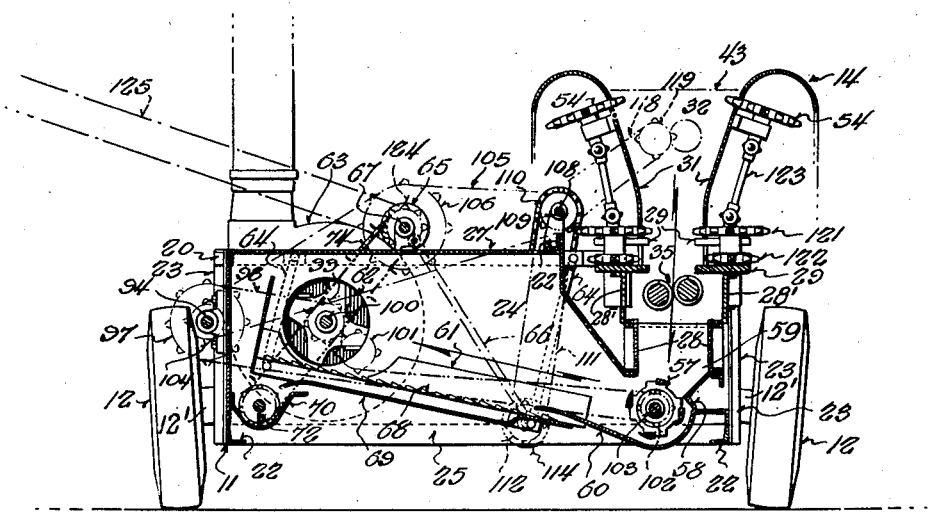
Figure 6:
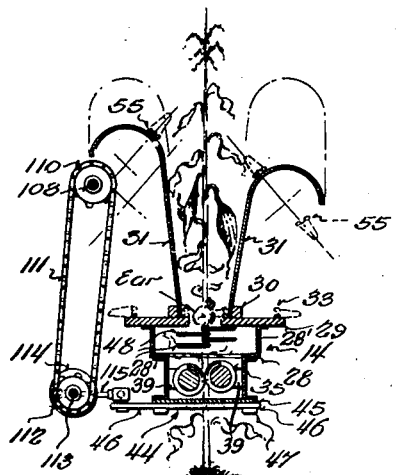

Fig. 3 is a transverse sectional view taken on the line 3—3 of Figs. 1 and 2, drive mechanism parts which are behind the line 3—3 being indicated by dot and dash lines to show their relationship to the rest of the parts;

Fig. 4 is another transverse sectional view taken on the line 4—4 of Fig. 2, parts being broken away;

Fig. 5 is a fragmentary sectional view of the discharge end of the storage bin conveyer, the same being taken on line 5—5 of Fig. 4, parts being broken away;

Fig. 6 is a transverse sectional view taken on the line 6—6 of Fig. 1;

Fig. 7 is an enlarged longitudinal fragmentary sectional view through the lower ends of the gatherers and rolls, taken on the line 7—7 of Fig. 8, parts being broken away;

Fig. 8 is a fragmentary plan view of the lower ends of the gatherers with parts removed and in section to more clearly illustrate structural details;

Fig. 9 is a fragmentary sectional view taken on the line 9—9 of Fig. 8;

Fig. 10 is an elevational detail view of the draw-bar adjustment, parts being broken away;

Fig. 11 is a fragmentary sectional view similar to Fig. 1 and illustrates a modification with respect to the chains for gathering fallen stalks, and the addition of positive means for feeding husks to the shredder;

Fig. 12 is a detail sectional view taken on the line 12—12 of Fig. 11;

Fig. 13 is a fragmentary section similar to Fig. 11 and showing the preferred modification of husk feeder; and Fig. 14 is a fragmentary vertical section on the line 14—14 Fig. 11, showing a modification in the arrangement of the shredder with relation to the snapping rolls.

Referring now more particularly to the accompanying drawings the numeral 11 designates generally a main harvester frame, supported upon wheels 12 mounted on stub axles 12' connected to the sides of the frame.

Pivotally connected to the front end of the frame 11, adjacent one side, is a draw-bar 13 for attachment to a traction unit (not shown), while mounted on the opposite side of the frame 11 is a gathering, snapping and husking unit 14.

Pivotally connected to the sides of the frame 11 adjacent its rear end is a trailer frame 15, supported at its rear end by a caster wheel assembly 16. A storage bin 81 of substantial capacity is mounted upon the trailer frame 15 to receive husked ears and shelled corn from the harvester, as will be described later in detail. The storage bin 81 is provided at one side with an upwardly inclined lateral discharge trough 82 for delivering ears and shelled corn from the storage bin 81 by means of a bucket conveyer 83 traveling over the bottom of the bin and trough.

From the foregoing explanation it will be seen that the present machine comprises essentially a combination of several units in cooperation with each other to accomplish the results enumerated in the preceding objects.

Considering the various units individually, the main harvester frame 11 consists of a fabricated structure comprising spaced upper and lower transverse angle irons 20, as best illustrated in Fig. 2, and 21, as best illustrated in Fig. 1. respectively, connected at their ends by suitable longitudinal angle iron braces 22 and upright angles 23, thus forming a box-like frame, for a housing 24, the latter including front and rear walls 25 and 26, respectively, and a cover 27, the bottom of the housing being open.

The gathering, snapping and husking unit 14 mounted on the main frame 11 includes a pair of spaced longitudinal channels 28 attached to the uprights 23, and inclined downwardly and forwardly beyond the forward end of the main frame 11. Supported on the channels 28 are longitudinally extending Z-beams 28'.

Mounted between the channels 28 is a pair of combination rolls 35, consisting essentially of lower feed sections 36, intermediate snapping and stalk discharge sections 37, and upper husking sections 38. A short distance upwardly from their lower ends the rolls are journaled in bearings 39, as best illustrated in Figs. 6 and 7, and at their upper ends in a transmission case 40, both of which are suitably attached to the spaced channels 28.

As will be noted best in Fig. 1, the lower feed and snapping sections of the rolls 35, except at the bearing portions 39, are provided with spiral fins 41 to cause the stalks gripped between the rolls to be fed rearwardly, those portions of the fins below the snapping sections 37 being more aggressive, having a faster lead, than the spiral on the snapping portions 37, which results in retarded rearward travel and slight compacting of the stalks in the snapping portions, to increase the tendency of downward feed between the rolls throughout that portion, which operation is further facilitated by suitable lugs 37' attached to the periphery of the rolls.

A vertical transverse partition 43 mounted between the side walls 31 of the trough 32, and spaced above the rolls in substantial alinement with the upper ends of the snapping portions 37, serves to deflect and minimize the possibility of further rearward travel of the stalks into the husking portions 38, of the rolls, but permits passage of the snapped ears, which are conveyed upwardly over the husking portions and discharged beyond their ends as will be later explained in detail.

As best shown in Figs. 1 and 7, a cutting mechanism 44 is mounted transversely on the under sides of the longitudinal channels 28 adjacent their lower ends, and rearwardly of the lower ends of the rolls 35, to sever the standing stalks closely adjacent the ground after they have been firmly gripped and held between the feed portions 36 of the rolls, thus insuring positive control of the stalks during and after the cutting operation.

The cutting unit 44 is conventional and consists of a notched shear plate 45, and a reciprocative sickle blade 46, guided between transversely spaced pairs of lugs 47.

Mounted on the Z-beams 28' are tables 29 provided adjacent their inner edges with rails 30, to which side walls 31 that form a gathering trough 32 are secured.

Mounted above the tables 29 are a plurality of sprockets which carry conventional front and rear sets of gathering and conveyor chains 33 and 34, respectively, which, as will be later described, aid in holding and carrying the stalks through the feeding and snapping portion of the rolls 35, and the snapped ears over the husking portions 38.

To prevent hanging or low ears from coming in contact with the lower feed portions 36 of the rolls, and resultant possible mutilation or snapping of the ears, a plurality of yieldable guard plates 48 are mounted on the Z-beams 28' above the feed portions 36 of the rolls, to permit passage of the stalks and at the same time support the ears in the manner indicated in Fig. 7. Opposite sets of the guard plates 48 are overlapped and provided adjacent their forward ends with pintles 49 journaled in the channels 28. The forward ends of the guards terminate in laterally offset tails 50, which project through holes 50' in the sides of the channels and are equipped with expansible coil springs 51 to normally urge the guards into the overlapped position shown. As the stalks enter the gatherers and pass between the rolls obviously the guards will yield and swing outwardly, at the same time affording supports for the ears which are sufficiently large to prevent passing through the relatively small opening between the guards caused by the stalks.

The forward ends of the gatherers are provided with conventional pivotal divider points 52 to closely follow the uneven contour of the ground and raise fallen stalks.

Inasmuch as fallen, bent or disalined stalks frequently have a tendency to lay over the top of the gatherers, a novel arrangement of gathering chains has been provided to meet this condition, and insure righting and guidance of fallen stalks rearwardly into the trough during travel of the machine. This is accomplished in that form shown in Figs. 1 and 2, by vertically disposed sprockets 53 mounted on transverse shafts 53' journaled on the gatherers and projecting through the crown or top portion of the gatherers, as best shown in Figs. 1 and 2, to carry gathering chains 55, which also travel over angularly disposed rear sprockets 54 projecting through the side walls 31, thus giving the exposed working stretches of the chains 55 approximately a quarter twist, the effect of which is to gradually swing the chain lugs from a vertical to an angular position coincident with righting of the stalks during their rearward traverse between the gatherers.

The same results are also accomplished by the modified form shown in Fig. 11, in which the forward sprockets 53" are positioned at substantially the same angle as the rear sprockets 56, so as to cause the lugs on the working stretches of the chains 55 to project slightly above the top plane of the gathering shields 31', as clearly shown in Fig. 12. This is the preferred construction in that it saves wear and tear upon the gathering chains occasioned by twisting as shown in Figs. 1 and 2.

An end wall 56 connected to the side walls 31 at their rear ends serves to deflect husked ears discharged from the ends of the rolls downwardly through a throat 56', in the manner indicated by the arrow in Fig. 1.

Mounted within the bottom of the housing 24, adjacent one of its sides and below the rolls 35, is a rotary chopper or shredder 57, having its axis disposed to extend in the same general direction as the axis of the rolls. The shredder 57 cooperates with an angle shear bar 58 mounted within the housing to shred the stalks and leaves fed downwardly through the snapping sections 37 of the rolls 35, and also the husks which are delivered to the shredder from the upper husking sections 38 through a chute 59.

In actual tests in the field, under certain conditions, it was found that frequently the snapped ears carried upwardly over the husking portions 38 of the rolls 35 by the conveyer chains 34, had a tendency to ride upon one another thus resulting in failure to completely husk some of the ears.

To overcome the foregoing, a rotary beater 130 is positioned above the rolls as shown in Fig. 11, causing the riding ears to be brushed downwardly until they come into contact with the husking portions of the rolls.

Also, it was found that during a heavy feed of husks and leaves through the rolls, gravity alone was insufficient to cause them to travel downwardly in the chute 59, which to some extent is also obstructed by the stalks fed through the snapping portions 37 of the rolls. Therefore, as shown in Figs. 11 and 13, positive means have been provided for feeding the husks to the chopper 57.

In Fig. 11 a beater 131 positioned within the lower end of the chute 59, and above the shredder 57, engages the husks and positively delivers them to the shredder, thus eliminating congestion and clogging within the chute.

Fig. 13 illustrates the preferred structure for obtaining the foregoing results, and consists of an endless conveyer 132 traveling over the bottom of the chute 59 between the rolls and chopper. This has the advantage of eliminating all tendency to throw material upwardly towards the rolls and cause clogging as might occur in the use of a beater under abnormal conditions.

As best shown in Fig. 3, the longitudinal channels 28 are positioned closely adjacent the rolls 35, while the shredder 57 is positioned substantially wholly within the bottom of the passage defined by the spaced channels. Under certain conditions with respect to the character and quantity of stalks fed to the shredder, it has been ascertained that when the butts of the stalks are engaged by the shredder blades during their upward travel, there is a tendency to kick or bounce the stalks upwardly, causing them to become wedged between the rolls 35 and channels 28 to cause eventual clogging of the passage. The space between the rolls and channels cannot be obstructed, as a clearance is required for leaves and other material that may wind itself around the rolls.

Therefore, to overcome the foregoing, in the preferred structure illustrated in Fig. 14, a greater clearance is provided between the rolls and channels to eliminate undue restricted spaces within which the stalks can be wedged. In addition, the shredder 57 is so positioned with relation to the passage, that its blades are exposed only during a portion of their downward travel, which effectively eliminates bouncing or kicking of the stalks upwardly.

Disposed below the shredder 57 is a slightly inclined plate 60 that guides the cut material discharged laterally by the shredder to a conventional shaker 61, reciprocatively mounted within the housing in substantially the same plane as that of the plate 60, thus avoiding any obstruction to conveyance of the cut material to the discharge end of the shaker, which terminates adjacent a side opening 62 formed in the housing 24 and communicating with a blower 63, which conveys and delivers the cut material to a trailer or other conveyance for subsequent transportation.

The shaker 61 is supporting upon oscillating links 64 pivotally carried by transverse members 20 of the main frame 11 to permit reciprocation of the shaker, by means of a pitman 65 connected with the shaker through a connecting rod 66, the pitman being mounted on a shaft 67 journaled in boxes attached to the top of the main frame.

As is customary, the reciprocative shaker 61 serves to separate the shelled corn from the cut feed during its travel over the toothed perforated feed bed 68 of the shaker, the shelled corn being dropped upon a screen or perforated plate 69, which separates the kernels from fine particles of dirt and trash.

Mounted transversely within the lower portion of the housing 24 below the discharge end of the screen 69, is a trough 70 for receiving the shelled corn, which is positively delivered rearwardly from the trough through a pipe 71 by a spiral conveyer 72. The pipe 71 communicates with an upwardly inclined casing 73 that houses a chain conveyer 74, which carries the shelled corn upwardly and discharges the same through a rearwardly inclined spout 75.

As best shown in Figs. 1 and 2, the fabricated trailer frame 15 consists of spaced upper and lower side angles 76 that converge rearwardly, and are connected at their rear ends by a yoke 77, supported upon the wheel caster 16. The forward ends of the side angles 76 are pivotally connected at 79 to the sides of the main frame 11, and intermediate their ends the side angles are connected by spaced transverse angle braces 80.

Supported upon the transverse braces 80 is a storage bin 81 for receiving husked ears discharge from the top of the rolls 35 as indicated by the arrow in Fig. 1. The bin 81 is of sufficient size to accommodate and store a substantial quantity of ears, thus providing sufficient periods of time between fillings to enable trucks or other conveyances to transport ears from the harvester to distant points, and return without interrupting operation of the harvester. To empty or discharge ears from the bin 81, the same is provided with a lateral upwardly inclined trough 82, and an endless bucket conveyer 83 traveling over the bottom of the bin and trough. The conveyer 83 is trained over end sprockets 84 and 84' and intermediate sprockets 84", while the working stretch of the conveyor is guided over the bottom of the bin 81 and trough 82 by idler rollers or sprockets 85.

As best shown in Figs. 2 and 4 the shelled corn delivery spout 75 extends through an enlarged opening 75' formed in the front wall of the bin 81, which permits relative movement between the bin and spout in travel over uneven ground.

The draw-bar 13 consists of a pair of converging angle iron arms 86, connected to a clevis 87 at their forward ends, and pivotally connected at their rear ends to the front and adjacent one side of the main frame 11 at 87. Suitable angular braces 88 and transverse braces 88' serve to reinforce the draw-bar and also provide a supporting frame for reception of an internal combustion engine in the event that it may be desired to provide operating power independent of tractor power take-off.

To provide relative adjustment between the draw-bar and main frame, a pivotal lever 89 is mounted on the forward end of the draw-bar and connected with the top of the frame 11 by a link 90. A detent 91 and notched sector 92 serve to lock the lever 89 in adjusted position.

*Drive*

In the present instance, power is transmitted to the harvester through a shaft 93 connected with the power take-off of a tractor (not shown), and to a main drive shaft 94 journaled in boxes mounted on the side of the main frame 11, through an intermediate telescopic shaft 95 and universal joints 96.

Mounted on the main drive shaft 94 is a sprocket 97, which carries a chain 98 trained over a sprocket 99 that operates the blower 63 through the shaft 100. From the sprocket 99, the chain 98 is trained under an idler sprocket 101 and then over a sprocket 102 mounted on the rear end of the shredder shaft 103.

Also mounted on the main drive shaft 94 adjacent the sprocket 97 is a reduced drive sprocket 104, which drives the shaft 67 through a chain 105 passing over a large sprocket 106 secured on the shaft. From the sprocket 106 the chain 105 passes over a sprocket 107 to drive a shaft 108 journaled in boxes 109 mounted on the top of the main frame 11. The forward end of the shaft 108 is provided with a sprocket 110 connected by a chain 111 with a sprocket 112, secured on a stub shaft 113 carried by the lower portion of the main frame and provided with a pitman 114, which reciprocates the sickle blade 46 through the connecting rod 115.

To drive the rolls 35 and the several chains 33, 34 and 55 power is taken off of the shaft 108 through a shaft 116 universally connected with the shaft 108 and a sprocket 117, which in turn is connected by a chain 118 with a sprocket 119 mounted on one of the rolls 35. As previously explained the upper ends of the rolls 35 are journaled in the transmission case 40, which provides suitable gearing connecting the rolls, and for driving sprockets 120, which carry the rear conveyer chains 34 that travel over sprockets 121 to drive the gathering chains 33 through the sprockets 122. Shafts 123 universally connected with the sprockets 122 and 54 serve to drive the quarter twist gathering chains 55.

The shelled corn conveyer 74 is operated through the shaft 67, and in turn drives the spiral conveyer 72 which delivers the shelled corn from the trough 70 to the conveyer housing 73. A sprocket 124 also mounted on the shaft 67, through a chain 125 drives a sprocket 126 mounted on a shaft 127 that operates the sprockets 84 and bucket conveyer 83. A manually actuated clutch 128 on the shaft 127 of any well-known type provides for selective operation of the conveyer 83.

As to the modification shown in Fig. 11 the shaft 120' of the conveyer sprocket 120 is extended upwardly and provided with a sprocket 133, which, through a twisted chain 134 serves to drive a sprocket 135 mounted on the shaft 130' of a beater 130, while the lower beater 131 is driven by a sprocket 135' connected by a chain 136 with the top beater 130.

In the modification of Fig. 13 the bottom 150 of the chute 59 is inclined and formed with openings 151. Suitably journalled below the bottom 150 are the shafts 152 and 153 for the endless conveyor 132. The latter may be of any suitable type and may include material moving flights 154. A drive sprocket 155 rigidly secured to the shaft 152 may be driven from the beater 130 by means of the chain or belt 136'. The latter is given a half twist in order to provide for the proper direction of drive of the endless conveyor 132.

*Operation*

Operation of the present invention is comparatively simple when considering the numerous operations performed in combination to most efficiently accomplish the ultimate results attained.

In operation the gatherers are alined to straddle a row of corn, and as the harvester is drawn forward by a tractor or other conveyance, the stalks in the row are gathered by the dividers 52 and guided into the gatherers 55.

As previously explained, fallen or bent stalks, particularly those leaning to one side of the row, have a tendency to ride upon the top of the inclined gatherers, and inasmuch as conventional gathering chains work only horizontally with relation to the walls of the gatherers, the stalks are not engaged by the chains and the resistance of the gatherers therefore carries them forward, until they fall below the gathering frames and are over-ridden by the machine.

In the present instance the novel arrangement of the gathering chains 55 overcomes the foregoing objection, in that the gathering lugs at the lower ends of the working stretches of the chain extend above the top of the gatherers, and because of the quarter twist in the chain, as heretofore explained and illustrated in Figs. 1 and 2, the lugs gradually assume an angular position as they travel rearwardly, which insures engagement between the lugs and stalks as the latter are gradually righted in entering the gatherers. This is highly important in that the present loss of down or bent stalks is considerable, particularly in spring or late harvesting after the crop has become dry and subjected to winds, snow and other elements.

As explained, in the modification shown in Fig. 11, the gatherers differ from the structure shown in Fig. 1, only in that the forward sprockets 53" are positioned at substantially the same angle as the rear sprockets 56, which accomplishes the foregoing result and eliminates the necessity of twisting the chains 55, thus reducing wear and tear.

Upon entering the rolls 35, the stalks must pass through the opposed sets of yieldable guard plates 48, which upon engagement with the stalks yield outwardly to permit passage, but at the same time still serve to support either low or drooping ears to prevent their engagement in the rolls with resultant snapping and mutilation, and in some instances even loss of the ears.

The lower sections 36 of the rolls serve merely to snugly grip and feed the stalks rearwardly by means of the fast spiral fins 41. While gripped by the lower ends of the rolls, as shown in Fig. 7, the stalk is engaged by the cutter 44, and is severed closely adjacent the ground, after which the stalk continues to be fed rearwardly and upwardly in a vertical position, assisted by the gathering chains 33 and 55.

After passing through the feed sections 36 of the rolls, the stalks enter the snapping sections 37 on which the lead of the spiral fin is less aggressive than on the feed sections, with the result that the stalks continue rearwardly at a slower rate of travel and in a slightly compacted condition. At the same time the stalks are fed downwardly to the rotary chopper or shredder 57. The downward feed of the stalks is facilitated by the lugs 37', and obviously as the stalks pass downwardly between the rolls the ears are snapped from the same and carried upwardly over the husking sections 38 by the lugs of the conveyor chains 34.

Here, the beater 130 serves to prevent riding of one ear upon the other and insures complete husking of every ear.

While the husking sections 38 may be of any conventional structure, it is proposed to utilize smooth rubber covered rolls for this purpose in that they not only efficiently remove the husks, but also reduce to a minimum mutilation of the shelled ears and dislodgement of the kernels. The shelled ears are then discharged over the top of the rolls and transmission case 40 through the throat 56' and into the storage bin 81.

From the sections 38 the husks are delivered to the shredder 57 through the chute 59, and are chopped together with the stripped stalks and leaves.

As previously explained either the beater 131, or the conveyer 132 serve to positively deliver husks to the shredder 57, and prevent clogging of the chute 59.

As the stalks and husks are cut or shredded by the chopper 57, the resultant feed is discharged laterally over the inclined plate 60 and delivered to the reciprocative shaker 61, together with any shelled corn that may have passed through the snapping or husking sections of the rolls. As will be noted in Fig. 3 the shaker 61 is slightly inclined in substantially a straight line with the inclined plate 60, thus offering no obstruction to direct delivery of feed to the shaker, and avoiding accumulation with resultant choking.

As previously stated, the reciprocative shaker is conventional and delivers cut feed to the blower conveyer 63 through the opening 62 formed in the side wall of the housing 24. At the same time the cleaned shelled corn is delivered to the trough 70, from which it is positively discharged by the spiral conveyer 72 into the housing 73, where the kernels are picked up by the elevating chain conveyer 74.

In practice, the machine is operated over the row until the bin 81 becomes substantially filled, at which time a truck or other conveyance is drawn alongside of the machine, and the bucket conveyer 83 is selectively operated through the clutch 128 to discharge ears from the bin through the inclined trough 82, and deliver the same into the receiving conveyance, after which the conveyer 83 is stopped and the truck is free to leave and transport the ears to a storage point and return for a new load, which is accumulated during its absence through continued operation of the harvester.

Summary

From the foregoing explanation considered in connection with the accompanying drawings it will be readily seen that an exceedingly compact, well-balanced and efficient corn harvester has been devised, which because of the several novel features incorporated is capable of handling crops, regardless of size and condition, with minimum loss in the harvested elements and consequent maximum economy.

In accomplishing the foregoing, emphasis is placed upon the importance of the novel arrangement of gathering chains to accommodate fallen or bent stalks which could not be successfully handled heretofore.

Also the provision of yieldable guard plates to prevent engagement of the ears by the feeding sections of the rolls is highly advantageous in eliminating mutilation of the ears and loss of the shelled corn.

The arrangement of the shaker trough with relation to the shredder is also important in preventing accumulation and choking of the feed in delivery to the blower conveyer.

In addition to the foregoing, one of the most salient features of the invention resides in the provision of a storage bin, which does away with the serious problem of collecting and transporting the husked ears and shelled corn from the harvester to a distant storage point, and while the discharge trough of the storage bin may extend rearwardly, the present lateral arrangement shown is highly preferable in that a transport conveyance can conveniently travel under the discharge end of the trough as the harvester moves over the road, thus eliminating the necessity of stopping the machine. Also, the lateral extension of the trough 83 provides more even distribution of weight, which is further accentuated by mounting the bin on a trailer frame rather than on a continuation of the main harvester frame.

While a specific structure has been illustrated and described in considerable detail, it is to be understood that various changes are contemplated in design without departing from the principles of the invention.

I claim:

1. In a corn harvester having a pair of upwardly inclined combination rolls having snapping and husking portions and disposed with the husking portions located above the snapping portions, having means for conveying ears upwardly on said husking portions, having a shredder positioned below the snapping portions of said rolls, and having a chute extending at an incline downwardly from below said husking portions to said shredder, a husk delivery member in said chute, and means for driving said delivery member in a direction to deliver husks to said shredder at least a portion of said delivery member being located above a portion of said chute and below the husking portions of said rolls in the path of husks delivered by said rolls toward said portion of the chute.

2. In a corn harvester having a pair of upwardly inclined combination rolls having snapping and husking portions and disposed with the husking portions located above the snapping portions, having means for conveying ears upwardly on said husking portions, having a shredder positioned below the snapping portions of said rolls, and having a chute extending at an incline downwardly from below said husking portions to said shredder, an endless conveyor extending at an incline downwardly in said chute from a position below the upper parts of the husking portions of said rolls to said shredder, and means for driving said conveyor in a direction to deliver husks to said shredder.

3. In a corn harvester having a pair of upwardly inclined combination rolls having snapping and husking portions and disposed with the husking portions located above the snapping portions, having means for conveying ears upwardly on said husking portions, having a shredder positioned below the snapping portions of said rolls, and having a chute extending at an incline downwardly from below said husking portions to said shredder, an endless conveyor extending at an incline downwardly in said chute from a position below the upper parts of the husking portions of said rolls to said shredder, and means for driving said conveyor in a direction to deliver husks to said shredder, the space between said combination rolls and said conveyor being progressively larger toward said shredder.

4. In a corn harvester having a pair of upwardly inclined combination rolls having snapping and husking portions and disposed with the husking portions located above the snapping portions, having means for conveying ears upwardly on said husking portions, having a shredder positioned below the snapping portions of said rolls, and having a chute extending at an incline downwardly from below said husking portions to said shredder, an endless conveyor extending longitudinally of said rolls at an incline downwardly in said chute from a position below the upper parts of the husking portions of said rolls to said shredder, and means for driving said conveyor in a direction to deliver husks to said shredder.

5. In a corn harvester having a pair of upwardly inclined combination rolls having snapping and husking portions and disposed with the husking portions located above the snapping portions, having means for conveying ears upwardly on said husking portions, having a shredder positioned below the snapping portions of said rolls, and having a chute extending at an incline downwardly from below said husking portions to said shredder, a rotatably mounted beater in said chute, and means for driving said beater in a direction to positively deliver husks to said shredder said beater being located above a portion of said chute and below the husking portions of said rolls in the path of husks delivered by said rolls toward said chute.

6. In a corn harvester having a pair of upwardly inclined combination snapping and husking rolls with the husking portions of said rolls located above the snapping portions, having means for conveying ears upwardly on said husking portions, having a shredder positioned below the snapping portions of said rolls with the axis of said shredder extending in the same general direction as the axis of said rolls, and having a chute extending at an incline downwardly from below said husking portions to an end of said shredder, an endless conveyor extending at an incline downwardly in said chute from a position below the upper parts of the husking portions of said rolls to said end of the shredder, and means for driving said conveyor in a direction to deliver husks to said shredder.

7. In a corn harvester having a pair of upwardly inclined combination rolls having snapping and husking portions and disposed with the husking portions located above the snapping portions, having means for conveying ears upwardly on said husking portions, having a horizontally disposed reel type shredder provided with knives positioned below the snapping portions of said rolls, and having a chute extending at an incline downwardly from below said husking portions to said shredder, a housing for said shredder, said housing having an entrance opening communicating with said chute and exposing that half of the upper portion of the reel wherein the knives travel in a downward arc, said housing substantially covering the other half of said upper portion.

HENRY L. ROSENTHAL.

REFERENCES CITED

The following references are of record in the file of this patent:

UNITED STATES PATENTS

| Number | Name | Date |
|---|---|---|
| 435,238 | McCollister et al. | Aug. 26, 1890 |
| 640,961 | Sells | Jan. 9, 1900 |
| 653,865 | Gordon et al. | July 17, 1900 |
| 696,347 | Locke | Mar. 25, 1902 |
| 879,404 | McInture | Feb. 18, 1908 |
| 970,266 | Raworth | Sept. 13, 1910 |
| 1,017,783 | Merwin | Feb. 20, 1912 |
| 1,034,152 | Skinner | July 30, 1912 |
| 1,528,635 | Ronning et al. | Mar. 3, 1925 |
| 1,708,327 | Riley | Apr. 9, 1929 |
| 1,722,717 | Trottman | July 30, 1929 |
| 1,729,648 | Mitchell | Oct. 1, 1929 |
| 1,734,972 | Johnson | Nov. 12, 1929 |
| 1,766,439 | Lang | June 24, 1930 |
| 1,810,600 | Giermann | June 16, 1931 |
| 2,333,901 | Swenson | Nov. 9, 1943 |